Patented June 5, 1951

2,556,135

UNITED STATES PATENT OFFICE 2,556,135

PREPARATION OF KETAL ESTERS

Willard J. Croxall, Bryn Athyn, and John O. Van Hook, Philadelphia, Pa., assignors to Rohm & Haas Company, Philadelphia, Pa., a corporation of Delaware No Drawing. Application March 19, 1949, Serial No. 82,470

12 Claims. (Cl. 260—338)

This invention relates to esters of carbalkoxy cyclic ketalacetic acids and to a method for their preparation. The esters prepared according to this method have the structure

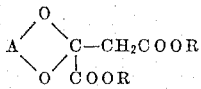

where A is a divalent group having a saturated chain of two to three carbon atoms between the two cyclic oxygen atoms to which this chain is joined and R is a non-tertiary alkyl group of not over four carbon atoms.

These esters are prepared by heating together in the presence of an acidic condensing agent (a) a dihydric alcohol in which the two hydroxyl groups are separated by a chain of two to three carbon atoms and (b) an ester of the formula $$(RO)_nCCH_nCOOR$$
$$|$$
$$COOR$$

where R is an alkyl group from methyl to butyl and $n$ is an integer from one to two. The alcohol ROH is separated and there is obtained an ester of a cyclic ketal 2-carbalkoxyacetic acid. From a glycol having two carbon atoms between hydroxyl groups there is obtained an alkyl carbalkoxy-1,3-dioxolaneacetate, and from a glycol having three carbon atoms between hydroxyl groups there is obtained an alkyl-2-carbalkoxy-m-dioxaneacetate. These products may also be named as derivatives of the cyclic ethers, as 2-carbalkoxy-2-carbalkoxymethyl-1,3-dioxolanes or 2-carbalkoxy-2-carbalkoxymethyl-1,3-dioxanes respectively.

The starting esters are dialkyl alpha,alpha-di-(alkoxy)-succinates or dialkyl alkoxymaleates in which the alkyl groups are methyl, ethyl, propyl, isopropyl, isobutyl, sec.-butyl, or n-butyl. Typical of these are dimethyl alpha,alpha-dimethoxysuccinate, dimethyl methoxymaleate, diethyl alpha,alpha-diethoxysuccinate, and diethyl ethoxymaleate, which form a preferred group of starting esters, and dipropyl alpha,alpha-dipropoxysuccinate, dipropyl propoxymaleate, dibutyl alpha,alpha-dibutoxsuccinate, etc. Mixtures of such ether succinates and maleates may be used.

The ether succinates,

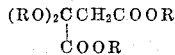

and the ether maleates

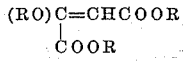

are obtainable through the reaction of acetylene and dialkyl carbonates, $(RO)_2CO$, in the presence of an anhydrous, strongly alkaline catalyst. As catalyst, there may be used an alkali metal acetylide, an alkali metal alcoholate, or a quaternary ammonium alcoholate, such as sodium or potassium acetylide, sodium methylate, potassium ethylate, sodium butoxide, benzyl trimethyl ammonium methoxide, or dibenzyl dimethyl ammonium tert.-butoxide. The reaction of acetylene and carbonate is effected at 20° C. to 110° C., usually by running acetylene into a mixture of the carbonate and catalyst. When acetylene is no longer taken up, the catalyst is destroyed as by neutralization and the products separated. After the alkyl beta,beta-dialkoxypropionate and alkyl beta-alkoxyacrylate have been taken off by distillation, there is obtained dialkyl dialkoxysuccinate and alkoxymaleate. These need not be separated from each other as a mixture can be used. Complete details of the reaction between acetylene and esters of carbonic acid are given in U. S. patent application Serial No. 52,607, filed by Croxall and Schneider on October 2, 1948, now Patent 2,535,012.

An example of a typical preparation of a diether succinate and ether maleate by the above-described method follows. Into a five-liter flask equipped with a gas-tight, stainless steel stirrer, the blades of which scraped the bottom of the flask, there were placed 225 grams of anhydrous ethyl alcohol and thereto were gradually added small cubes from 30 grams of sodium metal. The sodium was dissolved and excess alcohol evaporated under reduced pressure, leaving sodium ethylate as a dry powder. There was then added 2200 grams of dry diethyl carbonate.

The flask was then fitted with gas inlet and outlet tubes, a manometer, and a thermometer. It was flushed with nitrogen and heated to about 80° C. Acetylene from a commercial cylinder, washed with water, scrubbed with sulfuric acid, and passed over soda-lime, was run into the charge. When the rate of absorption of acetylene became slow, the flow of acetylene was cut off and the flask and contents cooled. The catalyst was neutralized with dilute acetic acid. The two layers which then formed were separated and the upper, oily layer distilled.

After a forerun at normal pressure had been taken off, distillation was continued under reduced pressure. Fractions of ethyl beta-ethoxyacrylate and ethyl beta,beta-diethoxypropionate were obtained. Between 75° C./4 mm. and 114° C./3 mm. there was distilled a fraction consisting of ethyl beta,beta-diethoxypropionate and diethyl alpha,alpha-diethoxysuccinate. At 114°–115° C./3–4 mm. the distillate consisted of diethyl alpha,alpha-diethoxysuccinate. On further distillation a fraction containing both this succinate and diethyl alpha-ethoxymaleate was obtained. Better yields of these two products are obtained when strongly basic quaternary alkoxide is used as the catalyst in place of the sodium ethylate.

In this same way dimethyl carbonate and acetylene yield dimethyl alpha,alpha-dimethoxysuccinate and methoxymaleate. Other diether succinates and ether maleates are obtained by the same general procedure. Of these, the ethyl and the methyl derivatives are preferred as starting materials.

The other main reactant for the preparation of the cyclic ketal carbalkoxy acetates of this invention is a glycol, HOAOH, where A contains not over twelve carbon atoms. As already stated, there must be a chain of two to three carbon atoms between the hydroxyl groups. The simplest glycols are ethylene glycol and trimethylene glycol, but there may likewise be used other 1,2- or 1,3-glycols in which the non-hydroxylated residue contains up to 12 carbon atoms. Typical of these are 1,2-propylene glycol, 1,2-butanediol, 1,3-butanediol, 2-methyl-1,3-propanediol, 2,2-dimethyl-1,3-propanediol, 2,3 - dimethyl - 1,3 - butanediol, 2-methyl-1,3-pentanediol, 2-methyl-2,3-pentanediol, 2-ethyl-1,3-pentanediol, 2,4-dimethyl-1,3-pentanediol, 2,2 - diethyl-1,3-propanediol, 2-isopropyl-2-methyl - 1,3 - propanediol, 2-isobutyl-2-methyl - 1,3 - propanediol, 2-tert.-butyl-2-methyl-1,3-propanediol, 2-ethyl -1,3- hexanediol, 2-isopropyl-1,3-pentanediol, 2-ethyl - 4 - methyl-1,3-pentanediol, 2,5 - dimethyl - 1,3 - hexanediol, 2-methyl-1,3-octanediol, 2-ethyl-1,3-heptanediol, 2-amyl-2-ethyl-1,3-propanediol, 2-hexyl-2-methyl-1,3-propanediol, phenyl - 1,2 - ethanediol, 1-phenyl - 1,2 - propanediol, 1-cyclohexyl-1,2-propanediol, 1-phenyl-1,3-propanediol, 1-phenyl-2,3-propanediol, and the like.

The reaction between the ether succinate or maleate and glycol is effected in the presence of an acidic catalyst. These are used generally in small amounts, 0.01% to 1% of the weight of reactants being usually sufficient. Acidic catalysts or condensing agents include not only free acids, such as phosphoric, p-toluene sulfonic, and the like, but also acid sulfates, such as sodium or potassium acid sulfates, Friedel-Crafts catalysts including anhydrous chlorides and bromides of zinc and aluminum, and boron trifluoride and its combination complexes with oxygenated organic compounds. Typical of these are the complexes of boron trifluoride and alcohols, aldehydes, carboxylic acids, esters, ketones, ethers, and the like. Examples include $BF_3 \cdot 2CH_3CHO$, $$BF_3 \cdot 2C_3H_7CHO, \; BF_3 \cdot 2CH_3COOH$$
$$BF_3 \cdot CH_3COCH_3, \; BF_3 \cdot CH_3COOC_2H_5$$
$$BF_3 \cdot C_4H_9OH, \; BF_3 \cdot C_2H_5OH$$
$$BF_3 \cdot C_2H_5OC_2H_5, \; BF_3 \cdot (C_4H_9)_2O, \; \text{etc.}$$

Reaction temperatures may vary from 75° C. to 250° C. and are preferably 100° to 200° C. The temperatures used depend upon the particular reactants, the catalyst and solvent used, if any. The boiling points of the alcohols displaced and/or solvent help determine the temperature for any given case. Inert organic solvents, such as hydrocarbons or chlorinated hydrocarbons, may be used under reflux and assist in removal of the alcohol ROH from the reaction mixture. About one mole of a glycol is taken per mole of ether succinate or maleate. From the former two moles of alcohol ROH are displaced and from the latter one mole. Thus, n moles of the alcohol ROH are taken off per mole of the starting ester.

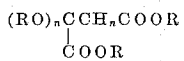

the catalyst destroyed, if desired, and the products worked up.

The products are for the most part liquids which have good solubility relations which adapt them for use as softeners and plasticizers. They are useful as chemical intermediates. They may be reacted to form resins.

The reaction is illustrated with the following typical preparations of products from both 1,2-glycols and 1,3-glycols.

*Example 1*

A mixture of 206 grams of dimethyl alpha,alpha-dimethoxysuccinate, 76 grams of trimethylene glycol, and two grams of sodium hydrogen sulfate is heated in a reaction vessel to a temperature of 155° C. to 210° C. There is evolved methanol which is taken off and condensed in an amount of 70 grams. The reaction mixture is then subjected to distillation under reduced pressure. Between 60° and 110° C./0.5 mm. there is obtained a fraction of 88 grams which corresponds in composition to 2-carbomethoxy-2-carbomethoxymethyl-1,3-dioxane. There remains in the distillation flask a viscous polymer. The distillate is redistilled at 109°–110° C./0.5 mm. It has a refractive index, $n_D^{20}$, of 1.4550, a density of 1.234, and a saponification equivalent of 110 (theory 109). It contains 49.62% of carbon and 6.45% of hydrogen. Theoretical values are 49.54% for the carbon content and 6.42% for the hydrogen content. The formula for this product is

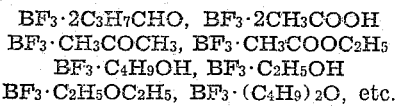

*Example 2*

There are mixed 262 grams of diethyl alpha,alpha-diethoxysuccinate, 76 grams of trimethylene glycol, and 2 grams of boron trifluoride-ethyl ether complex. The mixture is heated. Ethyl alcohol is evolved with pot temperatures of 150° to 200° C. When 92 grams of distillate have been taken off and condensed, the reaction mixture is cooled, washed with water, dried over anhydrous potassium carbonate, and distilled. The fraction distilling at 116°–125° C./0.1 mm. is identified as 2 - carbethoxy - 2 - carbethoxymethyl - 1,3 - dioxane. It had a refractive index of 1.4570 at 20° C. Its saponification equivalent is determined as 123. The theoretical value is also 123.

A 40-gram portion of the above product is heated under reflux with an aqueous 10% solution of sodium hydroxide in excess. In about five minutes the product goes into solution. Water and ethanol are distilled therefrom. The reaction mixture is then rendered acid with dilute hydrochloric acid and extracted with ethyl ether. The extract is dried on a dehydrated calcium sulfate drying agent and distilled. At 88° to 100° C./1 mm. there is thus obtained eight grams of 1,3-trimethylene dioxysuccinic anhydride.

*Example 3*

There are mixed in a reaction vessel equipped with a short fractionating column 262 grams of diethyl alpha,alpha-diethoxysuccinate, 62 grams of ethylene glycol, and about three grams of boron trifluoride-acetic acid complex. When the temperature of the mixture is raised to about 120° C., ethyl alcohol begins to distill. Heating is continued with the temperature of the reaction mixture rising to 170° C. With overhead temperature from 75° C. to 80° C. there are collected 88 grams of ethanol. The reaction mixture is then cooled, washed with water until neutral, dried over anhydrous potassium carbonate, and distilled under reduced pressure. At 110°–116° C./0.3 mm. there is obtained 83 grams of a distillate which corresponded in composition to 2-carbethoxy-2-carbethoxymethyl-dioxolane. It was found to have an index of refraction, $n_D^{20}$, of 1.4441 and to contain 52.41% of carbon and 7.10% of hydrogen. The theoretical carbon content is 51.72% and the hydrogen content is 7.10%.

*Example 4*

There is put into a reaction flask 125 grams of a mixture of diethyl alpha,alpha-diethoxysuccinate and diethyl ethoxymaleate, 31 grams of ethylene glycol, and about two grams of boron-trifluoride-acetic acid complex. This reaction mixture is heated to 125° C. whereupon ethyl alcohol is driven off. Heating is continued until a temperature of 185° C. is reached, at which point 82 grams of ethyl alcohol have been collected. The batch is then distilled at reduced pressures. The fraction distilling at 112°–116° C./0.3 mm. amounts to 68 grams and corresponds in composition to 2-carbethoxy-2-carbethoxymethyl dioxolane.

*Example 5*

There are mixed together and heated 262 grams of diethyl alpha,alpha-diethoxysuccinate, 62 grams of ethylene glycol, and three grams of anhydrous aluminum chloride. At batch temperatures of 125°–190° C. and overhead temperatures of 78° to 80° C. there are taken off 90 grams of ethyl alcohol. The reaction mixture is then subjected to distillation at low pressure to yield 209 grams of 2-carbethoxy-2-carbethoxymethyl dioxolane.

*Example 6*

A mixture of 206 grams of dimethyl alpha,alpha-dimethoxysuccinate, 62 grams of ethylene glycol, and two grams of p-toluene sulfonic acid is heated in a reaction vessel. At pot temperatures of 173° to 206° C. there is obtained with overhead temperatures of 63° to 73° C. 86 grams of methanol. Distillation is continued under reduced pressure. At 130° to 178° C./8 mm. there is obtained 50 grams of 2-carbomethoxy-2-carbomethoxymethyl dioxolane. At 178° to 186° C./8 mm. there is obtained a fraction of 46 grams consisting of the lactone

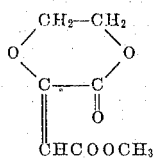

This product crystallizes when cool and may be recrystallized from benzene to give a product melting at 105.5°–106.5° C.

*Example 7*

A mixture of 103 grams of dimethyl alpha,-alpha-dimethoxysuccinate, 38 grams of 1,2-propylene glycol, and one gram of sodium acid sulfate is heated in a reaction vessel equipped with a short column. At a temperature of 170° to 200° C. for the mixture there is taken off methyl alcohol in an amount of 32 grams. Distillation is then conducted under low pressure. At 90° to 120° C./0.7–0.8 mm. there is obtained a fraction corresponding to 2-carbomethoxy-2-carbomethoxymethyl-4-methyl dioxolane,

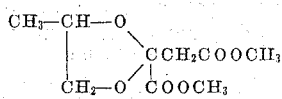

Higher boiling material and a resinous residue remain.

*Example 8*

A mixture of 103 grams of dimethyl alpha,-alpha-dimethoxysuccinate, 59 grams of 2-methyl-2,4-pentanediol, and two grams of sodium acid sulfate is heated in a reaction vessel at 150° to 200° C. About 30 grams of methyl alcohol are taken off. The reaction mixture is cooled, washed with water, dried over sodium sulfate, and distilled. The fraction coming over at 100°–130° C./0.3–0.8 mm. corresponds in composition to 2-carbomethoxy-2-carbomethoxymethyl-4,4,6-trimethyl-1,3-dioxane.

*Example 9*

A mixture of 103 grams of dimethyl alpha,-alpha-dimethoxysuccinate, 80 grams of 2-butyl-2-ethyl-1,3-propanediol, and two grams of boron trifluoride-butyl ether complex heated at 150°–210° C. liberates about 32 grams of methyl alcohol. On distillation at reduced pressures there is obtained at 95° to 125° C./0.1–0.3 mm. a fraction which corresponds to 2-carbomethoxy-2-carbomethoxymethyl-4-butyl-4-ethyl-1,3-dioxane.

By the same procedures there may be reacted other 1,2-glycols or 1,3-glycols and dialkyl dialkoxysuccinates or dialkyl alkoxymaleates or mixtures thereof in the presence of an acidic condensing agent. There occurs a transetherification with the glycol residue being introduced in the place of the alkyl groups or group forming the original ether. This alkyl group appears in an alcohol which is taken off to leave a dioxolane or dioxane diester. Since these alkyl groups are thus not used in the product, it is best to start with the smallest alkoxy groups, unless there is reason, such as need for improved hydrocarbon solubility, to have larger alcohol residues in the ester groupings. The practical limit here, however, is the butyl group, hence the limitation to alkyl groups of not over four carbon atoms.

We claim:

1. The process for the preparation of esters of lower aliphatic saturated monohydric alcohols and carbalkoxy cyclic ketalacetic acids which comprises reacting by heating together within the temperature range of 75° to 250° C. in the presence of an acidic condensing agent (a) an ester of the formula

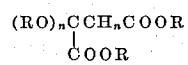

wherein $n$ is an integer from one to two and R is a non-tertiary alkyl group of not over four carbon atoms, and (b) a glycol of the formula HOAOH wherein A is a saturated divalent hydrocarbon group of not over twelve carbon atoms with a chain of two to three carbon atoms between the hydroxyl groups, and removing $n$ moles of an alcohol ROH from the reaction mixture per mole of said ester.

2. The process for the preparation of esters of lower aliphatic saturated monohydric alcohols and carbalkoxy cyclic ketalacetic acids which comprises reacting by heating together at 100° C. to 200° C. in the presence of an acidic condensing agent (a) an ester of the formula

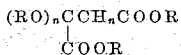

wherein $n$ is an integer from one to two and R is the residue of a non-tertiary monohydric alcohol ROH and is an alkyl residue of not over four carbon atoms, and (b) a glycol of the formula HOAOH wherein A is saturated divalent hydrocarbon group of not over twelve carbon atoms with a chain of two to three carbon atoms between the hydroxyl groups, removing $n$ moles of the alcohol ROH per mole of said ester, and separating a compound of the formula

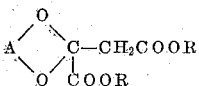

wherein R and A have the above-defined meanings.

3. The process of preparing dioxanes of the formula

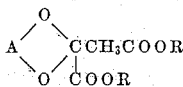

which comprises reacting by heating together at 100° C. to 200° C. in the presence of an acidic condensing agent (a) a diether succinate of the formula

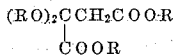

and (b) a glycol of the formula

HOAOH and separating two moles of an alcohol ROH per mole of said succinate, the term R in the above formulas representing a non-tertiary alkyl group of not over four carbon atoms and the term A representing an alkylene group having a chain of three carbon atoms between oxygen atoms and containing a total of not over twelve carbon atoms.

4. The process of claim 3 in which the glycol is trimethylene glycol.

5. The process of claim 4 in which the acidic condensing agent is a boron trifluoride catalyst.

6. The process of claim 4 in which the alkyl groups of the succinate are ethyl groups.

7. The process of claim 4 in which the alkyl groups of the succinate are methyl groups.

8. The process of preparing dioxolanes of the formula

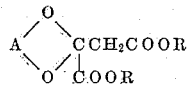

which comprises reacting by heating together at 100° C. to 200° C. in the presence of an acidic condensing agent (a) a diether succinate of the formula

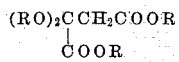

and (b) a glycol of the formula

HOAOH and separating two moles of an alcohol ROH per mole of said succinate, the term R in the above formulas representing a non-tertiary alkyl group of not over four carbon atoms and the term A representing an alkylene group having a chain of two carbon atoms between oxygen atoms and containing a total of not over twelve carbon atoms.

9. The process of claim 8 in which the glycol is ethylene glycol.

10. The process of claim 9 in which the acidic condensing agent is a boron trifluoride catalyst.

11. The process of claim 9 in which the alkyl groups of the succinate are ethyl groups.

12. The process of claim 9 in which the alkyl groups of the succinate are methyl groups.

WILLARD J. CROXALL.
JOHN O. VAN HOOK.

REFERENCES CITED

The following references are of record in the file of this patent:

UNITED STATES PATENTS

| Number | Name | Date |
|---|---|---|
| 2,293,868 | Toussaint | Aug. 25, 1942 |
| 2,406,504 | Morey | Aug. 27, 1946 |